(12) United States Patent
Hyun et al.

(10) Patent No.: US 9,720,159 B2
(45) Date of Patent: Aug. 1, 2017

(54) OPTICAL MEMBER AND DISPLAY DEVICE INCLUDING THE SAME

(71) Applicant: LG INNOTEK CO., LTD., Seoul (KR)

(72) Inventors: Soon Young Hyun, Seoul (KR); June Roh, Seoul (KR); Kyung Jin Kim, Seoul (KR); Ja Ram Kim, Seoul (KR); Jae Hong Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 15/407,944

(22) Filed: Jan. 17, 2017

(65) Prior Publication Data
US 2017/0123132 A1 May 4, 2017

Related U.S. Application Data

(63) Continuation of application No. 13/982,916, filed as application No. PCT/KR2011/009232 on Nov. 30, 2011, now Pat. No. 9,581,748.

(30) Foreign Application Priority Data

Jan. 31, 2011 (KR) .................. 10-2011-0009833

(51) Int. Cl.
    F21V 7/04      (2006.01)
    F21V 8/00      (2006.01)
    G02F 1/1335    (2006.01)
(52) U.S. Cl.
    CPC ......... *G02B 6/0026* (2013.01); *G02B 6/0068* (2013.01); *G02B 6/0073* (2013.01);
    (Continued)

(58) Field of Classification Search
    CPC ..... F21V 9/00; F21V 9/08; F21V 9/10; G02B 6/0003; G02B 6/0011; G02B 6/0013;
    (Continued)

(56) References Cited

U.S. PATENT DOCUMENTS 5,998,925 A   12/1999  Shimizu et al.
7,004,610 B2   2/2006  Yamashita et al.
(Continued)

FOREIGN PATENT DOCUMENTS

CN    1758114 A    4/2006
CN    1869788 A   11/2006
(Continued)

OTHER PUBLICATIONS

International Search Report in International Application No. PCT/KR2011/009232, filed Nov. 30, 2011.
(Continued)

*Primary Examiner* — Jason Moon Han
(74) *Attorney, Agent, or Firm* — Saliwanchik, Lloyd & Eisenschenk

(57) ABSTRACT

Disclosed are an optical member and a display device including the same. The optical member includes a receiving member; a host in the receiving member; and a plurality of wavelength conversion particles distributed in the host. The receiving member includes a light incident part having a first refractive index; and a light exit part having a second refractive index different from the first refractive index. The optical member improves the optical characteristics by adjusting the refractive indexes of the light incident part and the light exit part.

20 Claims, 8 Drawing Sheets

(52) U.S. Cl.
CPC ............... *G02F 1/1336* (2013.01); *G02F 2001/133614* (2013.01); *G02F 2202/36* (2013.01)

(58) Field of Classification Search
CPC .. G02B 6/0023; G02B 6/0026; G02B 6/0068; G02B 6/0073; G02F 1/1336; G02F 1/133615; G02F 2001/133614; G02F 2202/36
USPC .......................... 362/608, 621–622; 349/65
See application file for complete search history.

(56) References Cited

U.S. PATENT DOCUMENTS

| | | | |
|---|---|---|---|
| 7,040,774 | B2 | 5/2006 | Beeson et al. |
| 7,481,562 | B2 | 1/2009 | Chua et al. |
| 7,795,055 | B2 | 9/2010 | Lee et al. |
| 8,038,822 | B2 | 10/2011 | Kindler et al. |
| 8,545,083 | B2 | 10/2013 | Terajima et al. |
| 9,110,200 | B2 | 8/2015 | Nichol et al. |
| 9,244,209 | B2 | 1/2016 | Lee et al. |
| 9,304,355 | B2 | 4/2016 | Lee |
| 9,335,459 | B2 | 5/2016 | Kang |
| 2001/0001207 | A1 | 5/2001 | Shimizu et al. |
| 2002/0001055 | A1 | 1/2002 | Kimura et al. |
| 2002/0071071 | A1 | 6/2002 | Sekiguchi et al. |
| 2003/0066998 | A1 | 4/2003 | Lee |
| 2003/0165781 | A1 | 9/2003 | Takeda |
| 2004/0046242 | A1 | 3/2004 | Asakawa |
| 2004/0190279 | A1 | 9/2004 | Kitamura |
| 2005/0001225 | A1 | 1/2005 | Yoshimura et al. |
| 2005/0221519 | A1 | 10/2005 | Leung et al. |
| 2006/0002101 | A1 | 1/2006 | Wheatley et al. |
| 2006/0034084 | A1 | 2/2006 | Matsuura et al. |
| 2006/0034579 | A1 | 2/2006 | Sugiura |
| 2006/0072315 | A1 | 4/2006 | Han et al. |
| 2006/0092666 | A1 | 5/2006 | Jeong et al. |
| 2006/0132034 | A1 | 6/2006 | Cho et al. |
| 2006/0227532 | A1 | 10/2006 | Ko et al. |
| 2006/0227570 | A1 | 10/2006 | Rutherford et al. |
| 2006/0268537 | A1 | 11/2006 | Kurihara et al. |
| 2006/0268579 | A1 | 11/2006 | Han et al. |
| 2007/0004195 | A1 | 1/2007 | Park et al. |
| 2007/0012940 | A1 | 1/2007 | Suh et al. |
| 2007/0176196 | A1 | 8/2007 | Kim et al. |
| 2007/0210326 | A1 | 9/2007 | Kurihara |
| 2007/0221865 | A1 | 9/2007 | Sohn et al. |
| 2007/0221866 | A1 | 9/2007 | Sohn et al. |
| 2007/0221943 | A1 | 9/2007 | Moriya et al. |
| 2007/0228390 | A1 | 10/2007 | Hattori et al. |
| 2007/0229736 | A1 | 10/2007 | Wang et al. |
| 2007/0263408 | A1 | 11/2007 | Chua |
| 2008/0037272 | A1 | 2/2008 | Song et al. |
| 2008/0112186 | A1 | 5/2008 | Jung et al. |
| 2008/0237540 | A1 | 10/2008 | Dubrow |
| 2008/0284316 | A1 | 11/2008 | Kurihara et al. |
| 2009/0014688 | A1 | 1/2009 | Hoshino et al. |
| 2009/0021148 | A1 | 1/2009 | Hachiya et al. |
| 2009/0034292 | A1 | 2/2009 | Pokrovskiy et al. |
| 2009/0040598 | A1 | 2/2009 | Ito |
| 2009/0115936 | A1 | 5/2009 | Takeuchi et al. |
| 2009/0147497 | A1 | 6/2009 | Nada |
| 2009/0152567 | A1 | 6/2009 | Comerford et al. |
| 2009/0173957 | A1 | 7/2009 | Brunner et al. |
| 2009/0231847 | A1 | 9/2009 | Pan et al. |
| 2010/0079901 | A1 | 4/2010 | Fukushima |
| 2010/0110728 | A1 | 5/2010 | Dubrow et al. |
| 2010/0155749 | A1 | 6/2010 | Chen et al. |
| 2010/0164364 | A1 | 7/2010 | Eida et al. |
| 2010/0187975 | A1 | 7/2010 | Tsukahara et al. |
| 2010/0232133 | A1 | 9/2010 | Tran et al. |
| 2010/0232134 | A1 | 9/2010 | Tran |
| 2010/0283072 | A1 | 11/2010 | Kazlas et al. |
| 2010/0295438 | A1 | 11/2010 | Ott et al. |
| 2010/0302493 | A1 | 12/2010 | Yang et al. |
| 2010/0315320 | A1 | 12/2010 | Yoshida |
| 2011/0002140 | A1 | 1/2011 | Tsukahara et al. |
| 2011/0037926 | A1 | 2/2011 | Tsukahara et al. |
| 2011/0044046 | A1 | 2/2011 | Abu-Ageel |
| 2011/0090696 | A1 | 4/2011 | Nagai et al. |
| 2011/0141769 | A1 | 6/2011 | Lee et al. |
| 2011/0156575 | A1 | 6/2011 | Yu et al. |
| 2011/0176328 | A1 | 7/2011 | Anandan et al. |
| 2011/0205750 | A1 | 8/2011 | Krijn et al. |
| 2011/0249424 | A1 | 10/2011 | Joo et al. |
| 2011/0261303 | A1 | 10/2011 | Jang et al. |
| 2011/0299011 | A1 | 12/2011 | Weiss et al. |
| 2012/0106197 | A1 | 5/2012 | Lai et al. |
| 2012/0113672 | A1 | 5/2012 | Dubrow et al. |
| 2012/0170282 | A1 | 7/2012 | Lin et al. |
| 2013/0128548 | A1 | 5/2013 | Lin |
| 2014/0049826 | A1 | 2/2014 | Lee et al. |
| 2014/0153218 | A1 | 6/2014 | Hyun |
| 2014/0160789 | A1 | 6/2014 | Park |
| 2014/0168571 | A1 | 6/2014 | Hyun |
| 2015/0369993 | A1 | 12/2015 | Kim et al. |

FOREIGN PATENT DOCUMENTS

| | | |
|---|---|---|
| CN | 1880839 A | 12/2006 |
| CN | 1881034 A | 12/2006 |
| EP | 2068193 A2 | 6/2009 |
| JP | 09073807 A | 3/1997 |
| JP | 2004-303441 A | 10/2004 |
| JP | 2004315661 A | 11/2004 |
| JP | 2007005098 A | 1/2007 |
| JP | 2007173754 A | 7/2007 |
| JP | 2008287073 A | 11/2008 |
| JP | 2008311234 A | 12/2008 |
| JP | 2009200534 A | 9/2009 |
| JP | 2010123918 A | 6/2010 |
| KR | 20060056834 A | 5/2006 |
| KR | 10-2006-0125535 A | 12/2006 |
| KR | 20060129835 A | 12/2006 |
| KR | 20070092440 A | 9/2007 |
| KR | 20080007247 A | 1/2008 |
| KR | 20080063986 A | 7/2008 |
| KR | 10-2009-0021912 A | 3/2009 |
| KR | 10-2010-0024420 A | 3/2010 |
| KR | 20100027892 A | 3/2010 |
| KR | 20100046698 A | 5/2010 |
| KR | 20100047841 A | 5/2010 |
| KR | 20100118557 A | 11/2010 |
| KR | 20100129030 A | 12/2010 |
| KR | 20110012246 A | 2/2011 |
| KR | 20110068110 A | 6/2011 |
| KR | 20120001387 A | 1/2012 |
| KR | 1020120070449 A | 6/2012 |
| KR | 1020130009022 A | 1/2013 |
| TW | 200409384 | 6/2004 |
| TW | 200702822 | 1/2007 |
| TW | 200739192 | 10/2007 |
| TW | 200803600 A | 1/2008 |
| TW | 200848809 A | 12/2008 |
| TW | 201035484 A | 10/2010 |
| TW | 201041191 A | 11/2010 |
| TW | 201044067 A | 12/2010 |
| TW | 201105767 A | 2/2011 |
| WO | WO-2012144720 A1 | 10/2012 |

OTHER PUBLICATIONS

Office Action dated Jul. 31, 2012 in Korean Application No. 10-2011-0009833.
Office Action dated Mar. 13, 2015 in U.S. Appl. No. 13/982,916.
Office Action dated Mar. 16, 2016 in U.S. Appl. No. 13/982,916.
International Search Report in International Application No. PCT/KR2012/004625, dated Dec. 24, 2012.
Notice of Allowance dated Apr. 12, 2013 in Korean Application No. 10-2011-0071135.
European Search Report in European Application No. 12814589.3, dated Apr. 16, 2015.

(56) References Cited

OTHER PUBLICATIONS

Office Action dated Jun. 25, 2014 in Taiwanese Application No. 10-1121880.
Final Office Action dated Jul. 30, 2015 in U.S. Appl. No. 14/233,440.
European Search Report dated Sep. 7, 2015 in European Application No. 15172626.2.
International Search Report in International Application No. PCT/KR2012/004611, filed Jun. 11, 2012.
Taiwanese Office Action dated Jan. 23, 2015 in Taiwanese Application No. 101125849.
European Search Report dated Feb. 12, 2015 in International Application No. PCT/KR2012/004611.
International Search Report in International Application No. PCT/KR2012/004521, filed Jun. 8, 2012.
Office Action dated Dec. 3, 2014 in Taiwanese Application No. 101121510.
Office Action dated Dec. 24, 2012 in Korean Application No. 10-2011-0069797.
Office Action dated Aug. 18, 2015 in U.S. Appl. No. 14/232,843.
International Search Report in International Application No. PCT/KR2012/006308, filed Aug. 8, 2012.
Office Action dated Jan. 28, 2016 in Chinese Application No. 201280066300.9.
Office Action dated Aug. 30, 2016 in U.S. Appl. No. 14/234,123.
Office Action dated Jun. 19, 2015 in U.S. Appl. No. 14/234,123.
Office Action dated Dec. 14, 2016 in U.S. Appl. No. 14/234,123.
Office Action dated Nov. 25, 2016 in U.S. Appl. No. 14/747,577.
Office Action dated Dec. 29, 2016 in U.S. Appl. No. 15/136,239.
Office Action dated Jul. 5, 2016 in U.S. Appl. No. 14/356,657.
Office Action dated Jan. 5, 2017 in U.S. Appl. No. 14/356,657.
European Search Report in European Application No. 12814403.7 dated Feb. 13, 2015.
International Search Report in International Application No. PCT/KR2012/005418, filed Jul. 9, 2012.
Office Action dated Apr. 6, 2016 in Taiwanese Application No. 101126235.
Office Action dated Jul. 6, 2015 in U.S. Appl. No. 14/234,117.
Office Action dated Jan. 21, 2016 in U.S. Appl. No. 14/234,117.
International Search Report in International Application No. PCT/KR2012/005353, filed Jul. 5, 2012.
European Search Report dated May 22, 2015 in European Application No. 12811675.3.
Office Action dated Jul. 6, 2015 in U.S. Appl. No. 14/232,850.
Office Action dated Jun. 1, 2016 in U.S. Appl. No. 14/232,850.
Notice of Allowance dated Nov. 17, 2016 in U.S. Appl. No. 14/232,850.
Office Action dated Jun. 24, 2014, in Taiwanese Application No. 101122681.
European Search Report in European Application No. 12815508.2 filed May 28, 2014.
International Search Report in International Application No. PCT/KR2012/004610, filed Dec. 24, 2012.

OPTICAL MEMBER AND DISPLAY DEVICE INCLUDING THE SAME

CROSS-REFERENCE TO RELATED APPLICATIONS

This application is a continuation of U.S. application Ser. No. 13/982,916, filed Oct. 14, 2013; which is the U.S. national stage application of International Patent Application No. PCT/KR2011/009232, filed Nov. 30, 2011; which claims priority to Korean Application No. 10-2011-0009833, filed Jan. 31, 2011, the disclosures of each of which are incorporated herein by reference in their entirety.

TECHNICAL FIELD

The embodiment relates to an optical member and a display device including the same.

BACKGROUND ART

Recently, flat display devices, such as an LCD (liquid crystal display), a PDA (plasma display panel) or an OLED (organic light emitting diode), have been increasingly developed instead of conventional CRTs (cathode ray tubes).

Among them, the LCD includes a liquid crystal display panel having a thin film transistor substrate, a color filter substrate and a liquid crystal injected between the thin film transistor substrate and the color filter substrate. Since the liquid crystal display panel is a non-emissive device, a backlight unit is provided below the thin film transistor substrate to supply light. Transmittance of the light emitted from the backlight unit is adjusted according to the alignment state of the liquid crystal.

The backlight unit is classified into an edge-illumination type backlight unit and a direct-illumination type backlight unit according to the position of a light source. According to the edge-illumination type backlight unit, the light source is located at a lateral side of a light guide plate.

The direct-illumination type backlight unit has been developed as the size of the LCD has become enlarged. According to the direct-illumination type backlight unit, at least one light source is located below the liquid crystal display panel to supply the light over the whole area of the liquid crystal display panel.

When comparing with the edge-illumination type backlight unit, the direct-illumination type backlight unit can employ a large number of light sources so that the high brightness can be achieved. In contrast, the direct-illumination type backlight unit must have thickness larger than thickness of the edge-illumination type backlight unit in order to ensure brightness uniformity.

In order to solve the above problem, a quantum dot bar having a plurality of quantum dots, which can convert blue light into red light or green light, is positioned in front of a blue LED that emits the blue light. Thus, as the blue light is irradiated onto the quantum dot bar, the blue light, the red light and the green light are mixed and the mixed light is incident into the light guide plate, thereby generating white light.

If the white light is supplied to the light guide plate by using the quantum dot bar, high color reproduction may be realized.

The backlight unit may include an FPCB (flexible printed circuit board) provided at one side of the blue LED to supply signals and power to the LEDs and a bonding member formed under the bottom surface of the FPCB.

The display device capable of displaying various images using the white light supplied to the light guide plate through the quantum dot bar as the blue light is emitted from the blue LED has been extensively used.

BRIEF SUMMARY

Technical Problem

The embodiment provides an optical member having an improved optical characteristic and a display device including the same.

Technical Solution

An optical member according to one embodiment includes a receiving member; a host in the receiving member; and a plurality of wavelength conversion particles distributed in the host, wherein the receiving member includes a light incident part having a first refractive index; and a light exit part having a second refractive index different from the first refractive index.

A display device according to one embodiment includes a light guide plate; a display panel on the light guide plate; a light source at a lateral side of the light guide plate; and a wavelength conversion member interposed between the light source and the light guide plate, wherein the wavelength conversion member includes a host; wavelength conversion particles distributed in the host; and a receiving member surrounding the host, and wherein the receiving member includes a light incident part having a first refractive index and adjacent to the host; and a light exit part having a second refractive index different from the first refractive index, in which the host is sandwiched between the light incident part and the light exit part.

A display device according to one embodiment includes a light guide plate; a display panel on the light guide plate; a light source at a lateral side of the light guide plate; and a wavelength conversion member interposed between the light source and the light guide plate, wherein the wavelength conversion member includes a plurality of wavelength conversion particles to convert a wavelength of a light emitted from the light source; and a receiving member to receive the wavelength conversion particles, and wherein the receiving member includes a light incident part disposed between the wavelength conversion particles and the light source; and a light exit part disposed between the wavelength conversion particles and the light guide plate and having a refractive index different from a refractive index of the light incident part.

Advantageous Effects

The optical member according to the embodiment includes a receiving member having a light incident part and a light exit part, which has a refractive index different from that of the light incident part. The refractive indexes of the light incident part and the light exit part can be adjusted such that the optical member according to the embodiment may have the optimum light incident efficiency and light exit efficiency.

The optical member according to the embodiment uses the receiving member having various refractive indexes so that the light loss caused by reflection can be reduced and the light incident efficiency and the light exit efficiency can be improved.

Further, the optical member according to the embodiment may further include an anti-reflection layer. In detail, the anti-reflection layer is disposed on the light incident part and the light exit part so that the light loss caused by reflection can be reduced and the light incident efficiency and the light exit efficiency can be improved.

Therefore, the optical member according to the embodiment may have the improved optical characteristics and the display device including the optical member may have the improved brightness.

DETAILED DESCRIPTION

Figure 1:
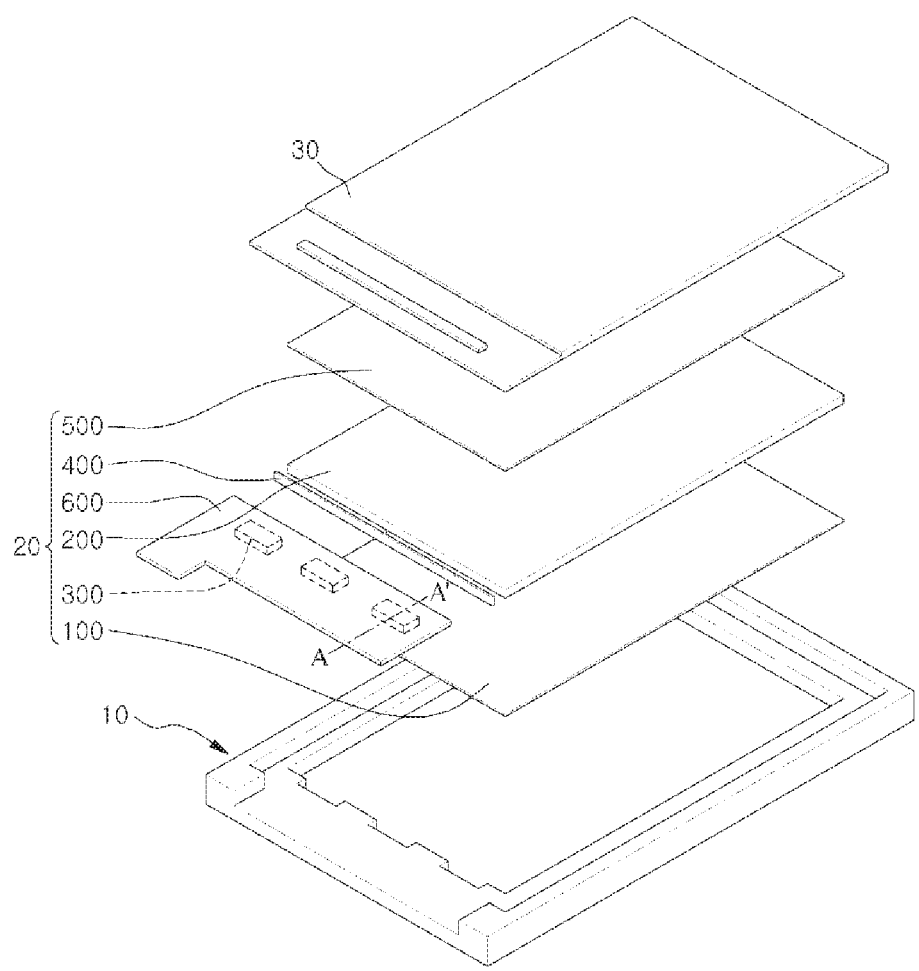
FIG. 1 is an exploded perspective view showing an LCD according to the first embodiment.

In the description of the embodiments, it will be understood that when a substrate, a frame, a sheet, a layer or a pattern is referred to as being on or under another substrate, another frame, another sheet, another layer, or another pattern, it can be directly or indirectly on the other substrate; frame; sheet, layer, or pattern, or one or more intervening layers may also be present. Such a position has been described with reference to the drawings. The thickness and size of each layer shown in the drawings may be exaggerated, omitted or schematically drawn for the purpose of convenience or clarity. In addition, the size of elements does not utterly reflect an actual size.

Figure 2:
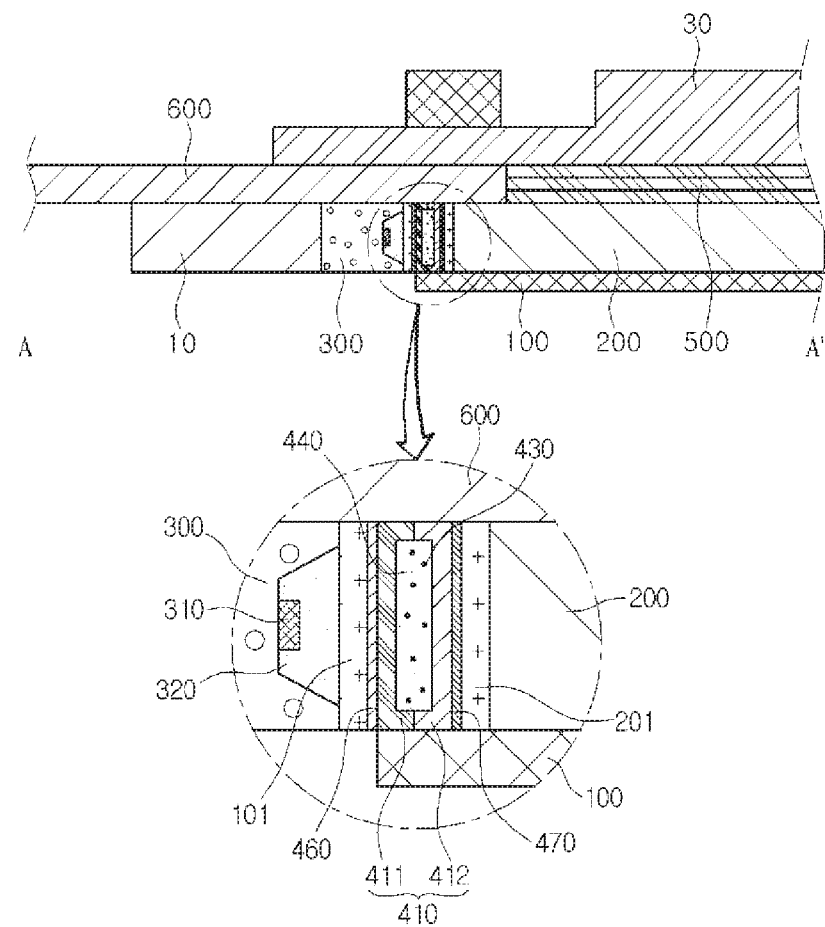
FIG. 2 is a sectional view taken along line A-A of FIG. 1.
Figure 3:
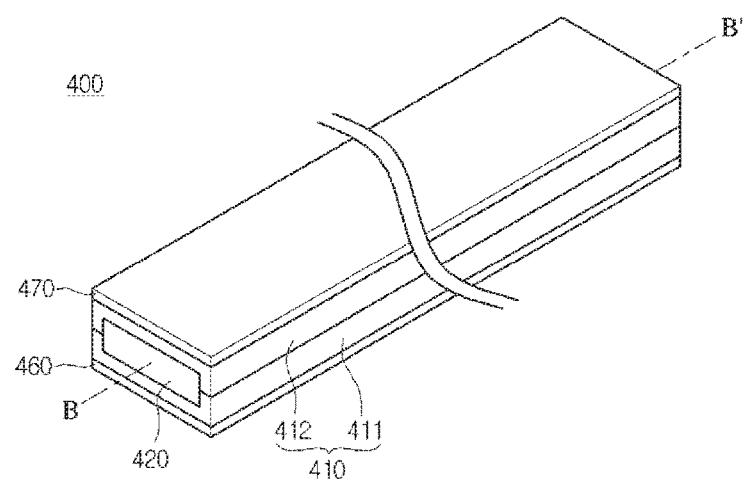
FIG. 3 is a perspective view of a wavelength conversion member according to the first embodiment.
Figure 4:
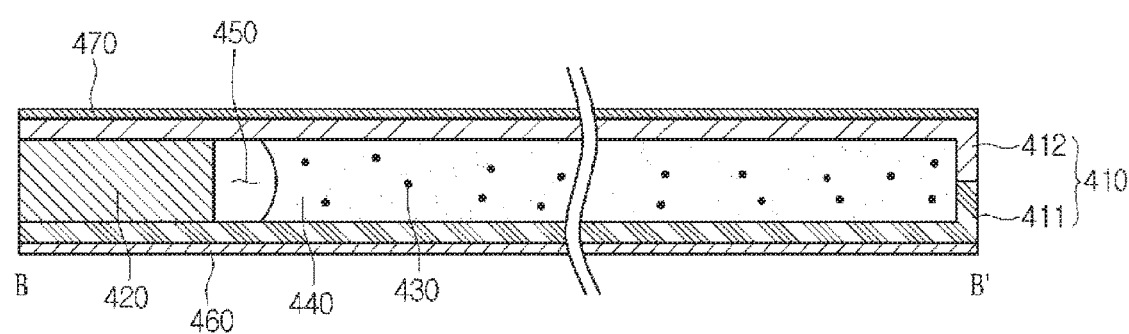
FIG. 4 is a sectional view taken along line B-B' of FIG. 3.

FIG. 1 is an exploded perspective view showing an LCD according to the first embodiment, FIG. 2 is a sectional view taken along line A-A' of FIG. 1, FIG. 3 is a perspective view of a wavelength conversion member according to the first embodiment; FIG. 4 is a sectional view taken along line B-B of FIG. 3 and FIGS. 5 to 8 are views showing the procedure for manufacturing the wavelength conversion member.

Referring to FIGS. 1 to 4, the LCD according to the embodiment includes a mold frame 10, a backlight unit 20 and a liquid crystal panel 30.

The mold frame 10 receives the backlight assembly 20 and the liquid crystal panel 30 therein. The mold frame 10 has a rectangular frame shape and may include plastic or reinforced plastic.

In addition, a chassis may be disposed below the mold frame 10. The chassis surrounds the mold frame 10 and supports the backlight assembly 20. The chassis may also be disposed at a lateral side of the mold frame 10.

The backlight assembly 20 is disposed in the mold frame 10 to supply the light toward the liquid crystal panel 30. The backlight assembly 20 includes a reflective sheet 100, a light guide plate 200, light emitting diodes 300, a wavelength conversion member 400, a plurality of optical sheets 500, and a flexible printed circuit board (ITCH) 600.

The reflective sheet 100 reflects the light upward as the light is generated from the light emitting diodes 300.

The light guide plate 200 is disposed on the reflective sheet 100. The light guide plate 200 guides the light upward by totally reflecting, refracting and scattering the light incident thereto from the light emitting diodes 300.

The light guide plate 200 includes an incident surface directed toward the light emitting diodes 300. From among lateral sides of the light guide plate 200, a lateral side directed toward the light emitting diodes 300 may serve as the incident surface.

The light emitting diodes 300 are disposed at the lateral side of the light guide plate 200. In detail, the light emitting diodes 300 are disposed at the incident surface.

The light emitting diodes 300 serve as a light source for generating the light. In detail, the light emitting diodes 300 emit the light toward the wavelength conversion member 400. In addition, the light emitting diodes 300 may include a light emitting diode chip 310 and a filling material 320 covering the light emitting diode 310. Further, the light emitting diodes 300 may further include a body for receiving the light emitting diode chip 310 and a lead electrode electrically connected to the light emitting diode chip 310.

The light emitting diodes 300 may include a blue light emitting diode generating the blue light or a UV light emitting diode generating the UV light. In detail, the light emitting diodes 300 can emit the blue light having the wavelength band of about 430 nm to about 470 nm or the UV light having the wavelength band of about 300 nm to about 400 nm.

The light emitting diodes 300 are mounted on the FPCB 600. The light emitting diodes 300 can be disposed under the FPCB 600. The light emitting diodes 300 are driven by receiving a driving signal through the FPCB 600.

The wavelength conversion member 400 is interposed between the light emitting diodes 300 and the light guide plate 200. In detail, the wavelength conversion member 400 is bonded to the lateral side of the light guide plate 200. In more detail, the wavelength conversion member 400 is attached to the incident surface of the light guide plate 200. In addition, the wavelength conversion member 400 can be bonded to the light emitting diodes 300.

The wavelength conversion member 400 receives the light from the light emitting diodes 300 to convert the wavelength of the light. For instance, the wavelength conversion member 400 can convert the blue light emitted from the light emitting diodes 300 into the green light and the red light. In detail, the wavelength conversion member 400 converts a part of the blue light into the green light having the wavelength in the range of about 520 nm to about 560 nm, and a part of the blue light into the red light having the wavelength in the range of about 630 nm to about 660 nm.

In addition, the wavelength conversion member 400 can convert the UV light emitted from the light emitting diodes 300 into the blue light, the green light and the red light. In detail, the wavelength conversion member 400 converts a part of the UV light into the blue light having the wavelength in the range of about 430 nm to about 470 nm, a part of the UV light into the green light having the wavelength in the range of about 520 nm to about 560 nm, and a part of the UV light into the red light having the wavelength in the range of about 630 nm to about 660 nm.

Therefore, the white light may be generated by the light passing through the wavelength conversion member 400 and the lights converted by the wavelength conversion member. In detail, the white light can be incident into the light guide plate 200 through the combination of the blue light, the green light and the red right.

As shown in FIGS. 2 to 4, the wavelength conversion member 400 includes a tube 410, a sealing member 420, a plurality of wavelength conversion particles 430, a host 440, a first anti-reflection layer 460 and a second anti-reflection layer 470.

The tube 410 receives the sealing member 420, the wavelength conversion particles 430 and the host 440 therein. That is, the tube 410 may serve as a receptacle to receive the sealing member 420, the wavelength conversion particles 430 and the host 440. In addition, the tube 410 extends in one direction.

The tube 410 may have a rectangular pipe shape. In detail, a section of the tube 410, which is vertical to the length direction of the tube 410, may have the rectangular shape. The tube 410 may have a width of about 0.6 mm and a height of about 0.2 mm. The tube 410 may include a capillary tube.

The tube 410 includes a light incident part 411 and a light exit part 412. The light incident part 411 is integrally formed with the light exit part 412. Although a boundary between the light incident part 411 and the light exit part 412 is clearly shown in the drawings, the boundary between the light incident part 411 and the light exit part 412 may be vague. In addition, the tube 410 may consist of the light incident part 411 and the light exit part 412.

The light incident part 411 faces the light emitting diodes 300. In detail, the light incident part 411 is opposite to the light exit part 412 of the light emitting diodes 300. That is, the light incident part 411 is closer to the light emitting diodes 300 than to the light exit part 412. The light incident part 411 is disposed between the light emitting diodes 300 and the wavelength conversion particles 430. In detail, the light incident part 411 is disposed between the light emitting diodes 300 and the host 440.

The light exit part 412 faces the light guide plate 200. In detail, the light exit part 412 is opposite to the lateral side of the light guide plate 200. The light exit 412 is closer to the light guide plate 200 than to the light incident 411. The light exit part 412 is disposed between the light guide plate 200 and the wavelength conversion particles 430. In detail, the light exit part 412 is disposed between the light guide plate 200 and the host 440.

The light incident part 411 faces the light exit part 412 while interposing the host 440 therebetween. That is, the host 440 is disposed between the light incident part 411 and the light exit part 412. In detail, the host 440 is sandwiched between the light incident part 411 and the light exit part 412.

The refractive index of the light incident part 411 is different from the refractive index of the light exit part 412. The light incident part 411 and the light exit part 412 may have various refractive indexes according to the optical design. For instance, the first refractive index of the light incident part 411 may be lower than the second refractive index of the light exit part 412. To the contrary, the first refractive index of the light incident part 411 may be higher than the second refractive index of the light exit part 412.

The tube 410 is transparent. The tube 410 may include glass. In detail, the tube 410 may include a glass capillary tube. In addition, the light incident part 411 and the light exit part 412 may include glass. At this time, the glass used for the light incident part 411 has the ingredient different from that of the glass used for the light exit part 412, so that the refractive index of the light incident part 411 is different from the refractive index of the light exit part 412. That is, the refractive index of the glass used for the light exit part 412 is different from the refractive index of glass used for the light incident part 411.

The sealing member 420 is disposed in the tube 410, The sealing member 420 is arranged at an end of the tube 410 to seal the tube 410. The sealing member 420 may include epoxy resin.

The wavelength conversion particles 430 are provided in the tube 410. In detail, the wavelength conversion particles 430 are uniformly distributed in the host 440 installed in the tube 410.

The wavelength conversion particles 430 convert the wavelength of the light emitted from the light emitting diodes 300. In detail, the light is incident into the wavelength conversion particles 430 from the light emitting diodes 300 and the wavelength conversion particles 430 convert the wavelength of the incident light. For instance, the wavelength conversion particles 430 can convert the blue light emitted from the light emitting diodes 300 into the green light and the red light. That is, a part of the wavelength conversion particles 430 converts the blue light into the green light having the wavelength in the range of about 520 nm to about 560 nm and a part of the wavelength conversion particles 430 converts the blue light into the red light having the wavelength in the range of about 630 nm to about 660 nm.

In addition, the wavelength conversion particles 430 can convert the UV light emitted from the light emitting diodes 300 into the blue light, the green light and the red light. That is, a part of the wavelength conversion particles 430 converts the UV light into the blue light having the wavelength in the range of about 430 nm to about 470 nm, and a part of the wavelength conversion particles 430 converts the UV light into the green light having the wavelength in the range of about 520 nm to about 560 nm. Further, a part of the wavelength conversion particles 430 converts the UV light into the red light having the wavelength in the range of about 630 nm to about 660 nm.

In other words, if the light emitting diodes 300 are blue light emitting diodes that emit the blue light, the wavelength conversion particles 430 capable of converting the blue light into the green light and the red light may be employed. In addition, if the light emitting diodes 300 are UV light emitting diodes that emit the UV light, the wavelength conversion particles 430 capable of converting the UV light into the blue light, the green light and the red light may be employed.

The wavelength conversion particles 430 may include a plurality of quantum dots. The quantum dots may include core nano-crystals and shell nano-crystals surrounding the core nano-crystals. In addition, the quantum dots may include organic ligands bonded to the shell nano-crystals. Further, the quantum dots may include an organic coating layer surrounding the shell nano-crystals.

The shell nano-crystals can be prepared as at least two layers. The shell nano-crystals are formed on the surface of the core nano-crystals. The quantum dots lengthen the wavelength of the light incident into the core nano-crystals by using the shell nano-crystals forming a shell layer, thereby improving the light efficiency.

The quantum dots may include at least one of a group-II compound semiconductor, a group-III compound semiconductor, a group-V compound semiconductor, and a group-VI compound semiconductor. In more detail, the core nano-crystals may include CdSe, InGaP, CdTe, CdS, ZnSe, ZnTe, ZnS, HgTe or HgS. In addition, the shell nano-crystals may include CuZnS, CdSe, CdTe, CdS, ZnSe, ZnTe, ZnS, HgTe or HgS. The quantum dot may have a diameter of about 1 nm to about 10 nm.

The wavelength of the light emitted from the quantum dots can be adjusted according to the size of the quantum dot or the molar ratio between the molecular cluster compound and the nano-particle precursor in the synthesis process. The organic ligand may include pyridine, mercapto alcohol, thiol, phosphine and phosphine oxide. The organic ligand may stabilize the unstable quantum dots after the synthesis process. Dangling bonds may be formed at the valence band and the quantum dots may be unstable due to the dangling bonds. However, since one end of the organic ligand is the non-bonding state, one end of the organic ligand is bonded with the dangling bonds, thereby stabilizing the quantum dots.

In particular, if the size of the quantum dot is smaller than the Bohr radius of an exciton, which consists of an electron and a hole excited by light and electricity, the quantum confinement effect may occur, so that the quantum dot may have the discrete energy level. Thus, the size of the energy gap is changed. In addition, the charges are confined within the quantum dot, so that the light emitting efficiency can be improved.

Different from general fluorescent pigments, the fluorescent wavelength of the quantum dot may vary depending on the size of the particles. In detail, the light has the shorter wavelength as the size of the particle becomes small, so the fluorescent light having the wavelength band of visible ray can be generated by adjusting the size of the particles. In addition, the quantum dot represents the extinction coefficient higher than that of the general fluorescent pigment by 100 to 1000 times and has the superior quantum yield, so that strong fluorescent light can be generated.

The quantum dots can be synthesized through the chemical wet scheme. According to the chemical wet scheme, the particles are grown by immersing the precursor material in the organic solvent, The quantum dots can be synthesized through the chemical wet scheme.

The host 440 surrounds the wavelength conversion particles 430. In detail, the wavelength conversion particles 430 are uniformly distributed in the host 440. The host 440 includes polymer. The host 440 is transparent. That is, the host 440 includes transparent polymer.

The host 440 is disposed in the tube 410. In detail, the host 440 is fully filled in the tube 410. The host 440 may adhere to an inner surface of the tube 410.

An air layer 450 is formed between the sealing member 420 and the host 440. The air layer 450 is filled with nitrogen. The air layer 450 performs the damping function between the sealing member 420 and the host 440.

The first anti-reflection layer 460 is disposed on the outer surface of the tube 410. In detail, the first anti-reflection layer 460 is disposed on the light incident part 411. The first anti-reflection layer 460 is disposed between the tube 410 and the light emitting diodes 300. In more detail, the first anti-reflection layer 460 is coated on the outer surface of the light incident part 411.

The first anti-reflection layer 460 reduces reflection of the light incident thereto from the light emitting diodes 300. The first anti-reflection layer 460 is transparent. The first anti-reflection layer 460 may include silicon oxide or silicon nitride. In addition, the first anti-reflection layer 460 may include magnesium fluoride (MgF2). Various materials having the proper refractive index can be used for the first anti-reflection layer 460 according to the optical design.

In addition, the first anti-reflection layer 460 may have various thicknesses according to the optical design. For instance, the first anti-reflection layer 460 may have a thickness in the range of about 100 Å to about 800 Å.

The second anti-reflection layer 470 is disposed on the outer surface of the tube 410. In detail, the second anti-reflection layer 470 is disposed on the light exit part 412. That is, the second anti-reflection layer 470 is disposed between the tube 410 and the light guide plate 200. In more detail, the second anti-reflection layer 470 is coated on the outer surface of the light exit part 412.

The second anti-reflection layer 470 improves the efficiency of the light output from the tube 410. The second anti-reflection layer 470 is transparent. The second anti-reflection layer 470 may include silicon oxide or silicon nitride. In addition, the second anti-reflection layer 470 may include magnesium fluoride (MgF2). Various materials having the proper refractive index can be used for the second anti-reflection layer 470 according to the optical design.

In addition, the second anti-reflection layer 470 may have various thicknesses according to the optical design. For instance, the second anti-reflection layer 470 may have a thickness in the range of about 100 Å to about 800 Å.

Referring to FIG. 2, the wavelength conversion member 400 is bonded to the light emitting diodes 300. A first adhesive layer 101 is interposed between the wavelength conversion member 400 and the light emitting diodes 300. The wavelength conversion member 400 can be bonded to the light exit surface of the light emitting diodes 300 through the first adhesive layer 101.

The wavelength conversion member 400 adheres to the first adhesive layer 101. In detail, the first anti-reflection layer 460 adheres to the first adhesive layer 101. In addition, the first adhesive layer 101 adheres to the light emitting diodes 300. In more detail, the first adhesive layer 101 adheres to the filling material 320. Thus, the air layer may not be present between the light emitting diodes 300 and the wavelength conversion member 400. That is, the light incident part 411 adheres to the light emitting diodes 300 through the first adhesive layer 101.

The first adhesive layer 101 is transparent. The first adhesive layer 101 may include an epoxy resin or an acryl resin.

In addition, the wavelength conversion member 400 is bonded to the light guide plate 200. A second adhesive layer 201 is interposed between the wavelength conversion member 400 and the light guide plate 200 and the wavelength conversion member 400 is bonded to the lateral side of the light guide plate 200 through the second adhesive layer 201.

The wavelength conversion member 400 adheres to the second adhesive layer 201. In detail, the second anti-reflection layer 470 adheres to the second adhesive layer 201. In addition, the second adhesive layer 201 adheres to the light guide plate 200. In detail, the second adhesive layer 201 adheres to the lateral side of the light guide plate 200. Thus, the air layer may not be present between the light guide plate 200 and the wavelength conversion member 400. That is, the light exit part 412 adheres to the light guide plate 200 through the second adhesive layer 201.

The second adhesive layer 201 is transparent. The second adhesive layer 201 may include an epoxy resin or an acryl resin.

In this manner, the light emitted from the light emitting diodes 300 can be incident to the light guide plate 200 through the wavelength conversion member 400 without passing through the air layer due to the first and second adhesive layers 101 and 201.

The light generated from the light emitting diode chip 310 is incident into the light guide plate 200 by way of the filling material 320, the first adhesive layer 101, the first anti-reflection layer 460, the light incident part 411, the host 440, the light exit part 412, the second anti-reflection layer 470 and the second adhesive layer 201.

The refractive indexes of the filling material 320, the first adhesive layer 101, the first anti-reflection layer 460, the light incident part 411, the host 440, the light exit part 412, the second anti-reflection layer 470, the second adhesive layer 201 and the light guide plate 200 must be properly adjusted in order to improve the light incident efficiency to the light guide plate 200.

Since the tube 410 can be designed such that the refractive index of the light incident part 411 may be different from the refractive index of the light exit part 412, the LCD according to the embodiment may have the improved brightness.

For instance, the refractive indexes may become higher in the sequence of the filling material 320, the first adhesive layer 101, the first anti-reflection layer 460, the light incident part 411, the host 440, the light exit part 412, the second anti-reflection layer 470, the second adhesive layer 201 and the light guide plate 200.

That is, the refractive index of the light exit part 412 may be lower than that of the light guide plate 200. In addition, the refractive index of the light incident part 411 may be lower than that of the light exit part 412. Further, the refractive index of the first anti-reflection layer 460 may be lower than that of the light incident part 411. In addition, the refractive index of the second anti-reflection layer 480 may be higher than that of the light exit part 412. Further, the refractive index of the first adhesive layer 101 may be lower than that of the light incident part 411. In addition, the refractive index of the second adhesive layer 201 may be higher than that of the light exit part 412.

To the contrary, the refractive indexes may become lower in the sequence of the filling material 320, the first adhesive layer 101, the first anti-reflection layer 460, the light incident part 411, the host 440, the light exit part 412, the second anti-reflection layer 470, the second adhesive layer 201 and the light guide plate 200.

In addition, the light incident part 411 may have the refractive index between the refractive index of the host 440 and the refractive index of the filling material 320. In detail, the light incident part 411 may have the refractive index between the refractive index of the first anti-reflection layer 460 and the refractive index of the host 440.

Further, the light exit part 412 may have the refractive index between the refractive index of the host 440 and the refractive index of the light guide plate 200. In detail, the light exit part 412 may have the refractive index between the refractive index of the host and the refractive index of the second anti-reflection layer 470.

In addition, the host 440 may have the refractive index between the refractive index of the light incident part 411 and the refractive index of the light exit part 412.

The first anti-reflection layer 460 may have the refractive index between the refractive index of the filling material 320 and the refractive index of the light incident part 411. In detail, the first anti-reflection layer 460 may have the refractive index between the refractive index of the first adhesive layer 101 and the refractive index of the light incident part 411.

Further, the second anti-reflection layer 470 may have the refractive index between the refractive index of the light exit part 412 and the refractive index of the light guide plate 200. In detail, the second anti-reflection layer 470 may have the refractive index between the refractive index of the light exit part 412 and the refractive index of the second adhesive layer 201.

In addition, the first adhesive layer 101 may have the refractive index between the refractive index of the filling material 320 and the refractive index of the light incident part 411. In detail, the first adhesive layer 101 may have the refractive index between the refractive index of the filling material 320 and the refractive index of the first anti-reflection layer 460.

Further, the second adhesive layer 201 may have the refractive index between the refractive index of the light exit part 412 and the refractive index of the light guide plate 200. In detail, the second adhesive layer 201 may have the refractive index between the refractive index of the second anti-reflection layer 470 and the refractive index of the light guide plate 200.

As a result, the layers 320, 101, 460, 411, 440, 412, 470, 201 and 200 serving as a path for the light can be designed such that the difference of the refractive index between adjacent layers can be minimized.

In this manner, the refractive indexes of the layers 320, 101, 460, 411, 440, 412, 470, 201 and 200 serving as the path for the light are properly adjusted through various schemes so that the LCD according to the embodiment may have the high brightness.

The optical sheets 500 are disposed on the light guide plate 200 to improve the characteristic of the light passing through the optical sheets 500.

The FPCB 600 is electrically connected to the light emitting diodes 300. The FPCB 600 can mount the light emitting diodes 300 thereon. The FPCB 600 is installed in the mold frame 10 and arranged on the light guide plate 200.

The mold frame 10 and the backlight assembly 20 constitute the backlight unit. That is, the backlight unit includes the mold frame 10 and the backlight assembly 20.

The liquid crystal panel 30 is installed in the mold frame 10 and arranged on the optical sheets 500.

The liquid crystal panel 30 displays images by adjusting intensity of the light passing through the liquid crystal panel 30. That is, the liquid crystal panel 30 is a display panel to display the images. The liquid crystal panel 30 includes a TFT substrate, a color filter substrate, a liquid crystal layer interposed between the above two substrates and polarizing filters.

FIGS. 5 to 8 are views showing the procedure for manufacturing the wavelength conversion member 400. The wavelength conversion member 400 can be manufactured through the following method.

Figure 5:
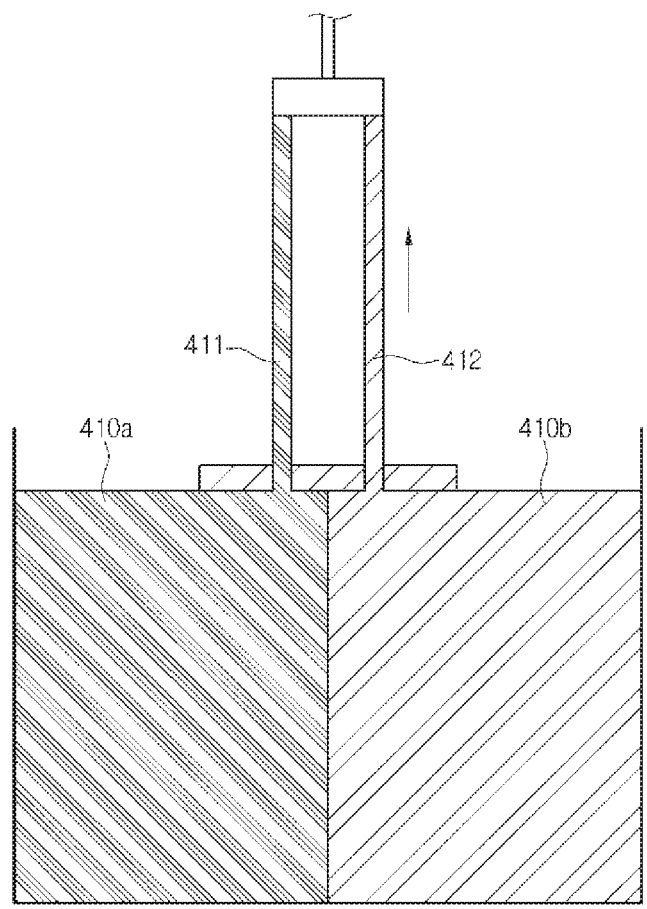
FIGS. 5 to 9 are views showing the procedure for manufacturing a wavelength conversion member.

Referring to FIG. 5, the tube 410 including the light incident part 411 and the light exit part 412 is formed. In detail, the light incident part 411 can be formed by drawing a first molten glass 410a and the light exit part 412 can be formed by drawing a second molten glass 410b.

In more detail, the tube 410 can be formed by simultaneously drawing and cooling the first molten glass 410a and the second molten glass 410b. At this tune, the ingredient of the first molten glass 410a may be different from the ingredient of the second molten glass 410b.

Figure 6:
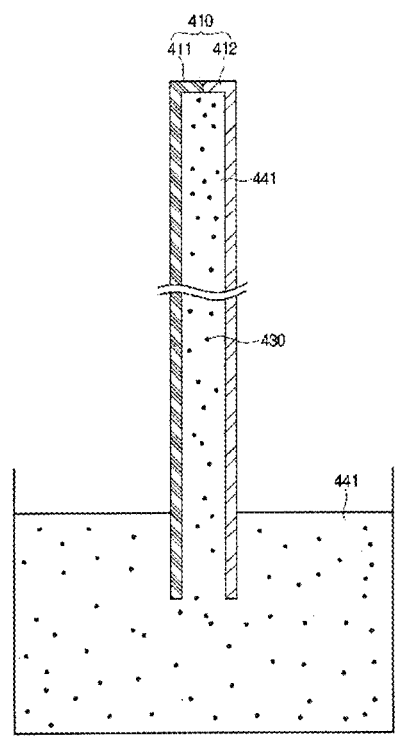

Referring to FIG. 6, the wavelength conversion particles 430 are uniformly distributed in a resin composition 441. The resin composition 441 is transparent. The resin composition 411 may have photo-curable property.

Then, internal pressure of the tube 410 is reduced, an inlet of the tube 410 is immersed in the resin composition 441 in which the wavelength conversion particles 430 are distributed, and ambient pressure is increased. Thus, the resin composition 411 having the wavelength conversion particles 430 is introduced into the tube 410.

Figure 7:
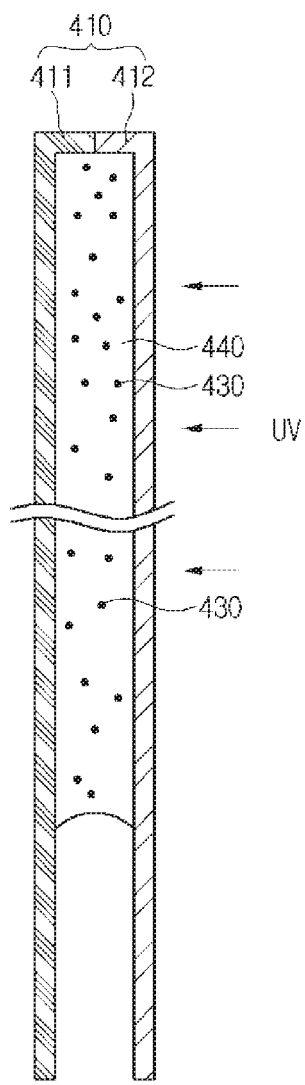

Referring to FIG. 7, a part of the resin composition 441 introduced into the tube 410 is removed and the inlet of the tube 410 becomes empty. Then, the resin composition 441 introduced into the inlet of the tube 410 is cured by UV light so that the host 440 can be formed.

Figure 8:
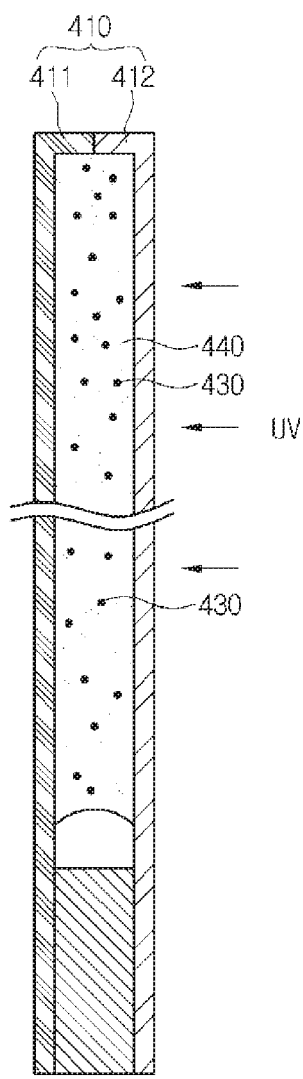

Referring to FIG. 8, epoxy resin composition is introduced into the inlet of the tube 410. Then, the epoxy resin composition is cured so that the sealing member 420 is formed. The process for forming the sealing member 420 is performed under the nitrogen atmosphere, so the air layer 450 including nitrogen is formed between the sealing member 420 and the host 440.

Figure 9:
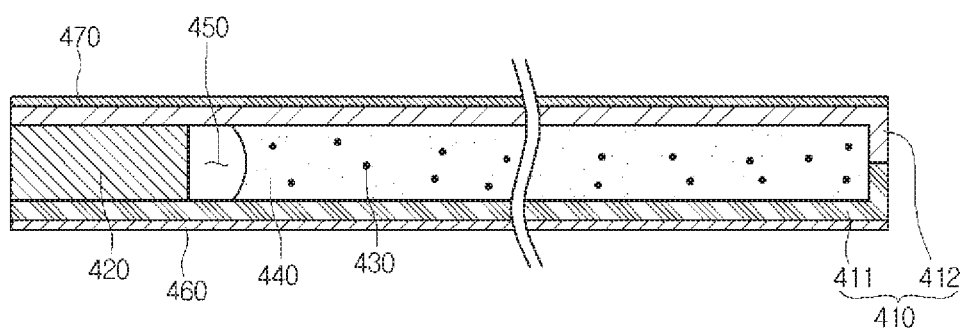

Referring to FIG. 9, the first anti-reflection layer 460 is formed on the light incident part 411 through a vacuum deposition process and the second anti-reflection layer 470 is formed on the light exit part 412 through the vacuum deposition process.

The first and second anti-reflection layers 460 and 470 can be formed just after the tube 410 has been formed. That is, the first and second anti-reflection layers 460 and 470 can be formed before the resin composition 441 is introduced into the tube 410.

In this manner, the wavelength conversion member 400 is manufactured.

As described above, the tube 410 includes the light incident part 411 and the light exit part 412 having refractive indexes different from each other. The refractive indexes of the light incident part 411 and the light exit part 412 can be adjusted in such a manner that the wavelength conversion member 400 according to the embodiment may have the optimum light incident efficiency and the light exit efficiency.

For instance, the host 440 may have the refractive index between the refractive index of the light incident part 411 and the refractive index of the light exit part 412. In addition, the light exit part 412 may have the refractive index between the refractive index of the host 440 and the refractive index of the light guide plate 200. Further, the light guide plate 200 may have the refractive index higher than the refractive index of the light exit part 412, and the light exit part 412 may have the refractive index higher than the refractive index of the light incident part 411. In addition, the refractive index of the filling material of the light emitting diodes 300 may be lower than the refractive index of the light incident part 411, and the refractive index of the light incident part 411 may be lower than the refractive index of the light exit part 412.

Therefore, the wavelength conversion member 400 can reduce the light loss caused by reflection and can improve the light incident efficiency and the light exit efficiency by using the tube 410 including the light incident part 411 and the light exit part 412 having refractive indexes different from each other.

The wavelength conversion member 400 can reduce the light loss caused by reflection and can improve the light incident efficiency and the light exit efficiency by using the first and second anti-reflection layers 460 and 470.

Therefore, the LCD according to the embodiment may have the improved optical characteristics and improved brightness.

Any reference in this specification to one embodiment, an embodiment, example embodiment, etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effects such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

INDUSTRIAL APPLICABILITY

The LCD according to the embodiments can be used in the display field.

What is claimed is:

1. A backlight assembly comprising:
a reflective sheet;
a light guide plate on the reflective sheet;
an optical sheet on the light guide plate;
a light source disposed at a lateral side of the light guide plate;
a printed circuit board (PCB) on which the light source is disposed; and
a wavelength conversion member disposed between the light source and the light guide plate;
wherein the wavelength conversion member comprises:
a tube;
a host in the tube;
an empty space in the tube; and
a plurality of wavelength conversion particles in the host,
wherein the tube comprises:
a light incident part having a first refractive index and adjacent to the host;
a light exit part having a second refractive index;
a first distal end;
a second distal end opposite to the first distal end;
a first tube portion;
a second tube portion adjacent to the first tube portion; and
a midpoint between the first distal end and the second distal end along a first direction that is parallel to a central longitudinal axis of the tube,
wherein the first tube portion extends from the first distal end to the midpoint and comprises the empty space and a portion of the host,
wherein the second tube portion extends from the midpoint to the second distal end and comprises a portion of the host,
wherein the light source comprises:
a light emitting diode chip to generate a light; and
a filling material to cover the light emitting diode chip,
wherein the filling material has a third refractive index,
wherein the light guide plate has a fourth refractive index,
wherein at least one of the first refractive index and the second refractive index is different from the fourth refractive index,
wherein the wavelength conversion particles comprise quantum dots (QDs), and
wherein the tube extends continuously along the lateral side of the light guide plate.

2. The backlight assembly of claim 1, wherein the light source includes a plurality of LEDs and wherein the LEDs are disposed on a lateral side of the light guide plate.

3. The backlight assembly of claim 1, wherein a length of the portion of the host of the first tube portion, taken in the first direction, is less than a length of the portion of the host of the second tube portion, taken in the first direction.

4. The backlight assembly of claim 1, wherein the mass of the portion of the host of the first tube portion is smaller than the mass of the portion of the host of the second tube portion.

5. The backlight assembly of claim 1, wherein the empty space includes nitrogen.

6. The backlight assembly of claim 1, further comprising an adhesive part disposed between the PCB and the wavelength conversion member.

7. The backlight assembly of claim 1, wherein the fourth refractive index is higher than at least one of the first refractive index and the second refractive index.

8. The backlight assembly of claim 1, wherein the fourth refractive index is lower than at least one of the first refractive index and the second refractive index.

9. The backlight assembly of claim 1, at least one of the first refractive index and the second refractive index is higher than the third refractive index.

10. The backlight assembly of claim herein at least one of the first refractive index and the second refractive index is lower than the third refractive index.

11. The backlight assembly of claim 1, wherein the tube includes glass.

12. A display device comprising:
a frame;
a backlight assembly on the frame;
a liquid crystal panel on the backlight assembly;
wherein the backlight assembly comprises:
a reflective sheet;
a light guide plate on the reflective sheet;
an optical sheet on the light guide plate;
a plurality of LEDs disposed at a lateral side of the light guide plate;
a printed circuit board (PCB) on which the light source is disposed; and
a wavelength conversion member disposed between the light source and the light guide plate;
wherein the wavelength conversion member comprises:
a tube;
a host in the tube;
an empty space in the tube; and
a plurality of wavelength conversion particles in the host, wherein the tube comprises:
a light incident part having a first refractive index and adjacent to the host;
a light exit part having a second refractive index;
a first distal end;
a second distal end opposite to the first distal end;
a first tube portion;
a second tube portion adjacent to the first tube portion; and
a midpoint between the first distal end and the second distal end along a first direction that is parallel to a central longitudinal axis of the tube,
wherein the first tube portion extends from the first distal end to the midpoint and comprises the empty space and a portion of the host,
wherein the second tube portion extends from the midpoint to the second distal end and comprises a portion of the host,
wherein the LED comprises:
a light emitting diode chip to generate a light; and
a filling material to cover the light emitting diode chip,
wherein the filling material has a third refractive index,
wherein the light guide plate has a fourth refractive index,
wherein at least one of the first refractive index and the second refractive index is different from the fourth refractive index,
wherein the wavelength conversion particles comprise quantum dots (QDs) and
wherein the tube extends continuously along the lateral side of the light guide plate.

13. The display device of claim 12, wherein a length of the portion of the host of the first tube portion, taken in the first direction, is less than a length of the portion of the host of the second tube portion.

14. The display device of claim 12, wherein the mass of the portion of the host of the first tube portion, taken in the first direction, is smaller than the mass of the portion of the host of the second tube portion.

15. The display device of claim 12, wherein the empty space includes nitrogen.

16. The display device of claim 12, further comprising an adhesive part disposed between the PCB and the wavelength conversion member.

17. The display device of claim 12, wherein the fourth refractive index is higher than at least one of the first refractive index and the second refractive index.

18. The display device of claim 11, wherein the fourth refractive index is lower than at least one of the first refractive index and the second refractive index.

19. The display device of claim 12, wherein at least one of the first refractive index and the second refractive index is higher than the third refractive index.

20. The display device of claim 12, wherein the tube includes glass.

* * * * *